United States Patent [19]
Kikuchi

[11] Patent Number: 6,122,244
[45] Date of Patent: Sep. 19, 2000

[54] RECORDING MEDIUM LOADING DEVICE

[75] Inventor: Hideo Kikuchi, Miyagi-ken, Japan

[73] Assignee: Alps Electric Co., Ltd., Tokyo, Japan

[21] Appl. No.: 09/160,441

[22] Filed: Sep. 24, 1998

[30] Foreign Application Priority Data

Oct. 2, 1997 [JP] Japan .................................... 9-269791

[51] Int. Cl.⁷ ................................................. G11B 17/08
[52] U.S. Cl. ......................................................... 369/178
[58] Field of Search ..................................... 369/176, 178, 369/179, 191, 192

[56] References Cited

U.S. PATENT DOCUMENTS

| | | | |
|---|---|---|---|
| 4,042,289 | 8/1977 | Heinonen et al. | 439/629 |
| 4,515,416 | 5/1985 | Teramachi | 384/45 |
| 4,795,284 | 1/1989 | Yumoto et al. | 400/352 |
| 5,144,508 | 9/1992 | Noda et al. | 360/99.06 |
| 5,436,995 | 7/1995 | Yoshizawa | 385/86 |
| 5,574,705 | 11/1996 | Suzuki | 369/36 |
| 5,634,673 | 6/1997 | Miyazaki et al. | 285/148.5 |
| 5,781,368 | 7/1998 | Kotaki et al. | 360/92 |
| 5,805,561 | 9/1998 | Pollard | 369/178 |
| 5,982,734 | 11/1999 | Yamashita et al. | 369/178 |

FOREIGN PATENT DOCUMENTS

| | | |
|---|---|---|
| 0 709 169 A2 | 5/1996 | European Pat. Off. . |
| 56-169964 | 12/1981 | Japan . |
| 0151087 | 6/1989 | Japan . |
| 01227107 | 9/1989 | Japan . |
| 09222950 | 8/1997 | Japan . |

Primary Examiner—David L. Ometz
Assistant Examiner—Franklin D. Altman
Attorney, Agent, or Firm—Brinks Hofer Gilson & Lione

[57] ABSTRACT

In a recording medium loading device which permits a package containing a recording medium to be loaded removably into the body of the device, the package has a guide groove extending linearly in a direction of insertion into the device body, a lock groove contiguous to the guide groove and formed in a concave shape in a direction intersecting the direction of insertion, and a stopper groove extending along the direction of insertion and in parallel with the guide groove. In a package loading area of the device body are provided a lock member adapted to engage the lock groove to lock the package at a loaded position, an urging member for urging the lock member in a direction of engagement with the lock groove, a stopper projection adapted to project into the stopper groove, an unlocking member for disengaging the lock member from the lock groove and causing the stopper projection to project into the stopper groove, and an eject member for pushing out the package in a disengaged state of the lock member from the lock groove. The package when moving in an ejecting direction is stopped at an intermediate position by engagement of the stopper projection with the stopper groove.

4 Claims, 6 Drawing Sheets

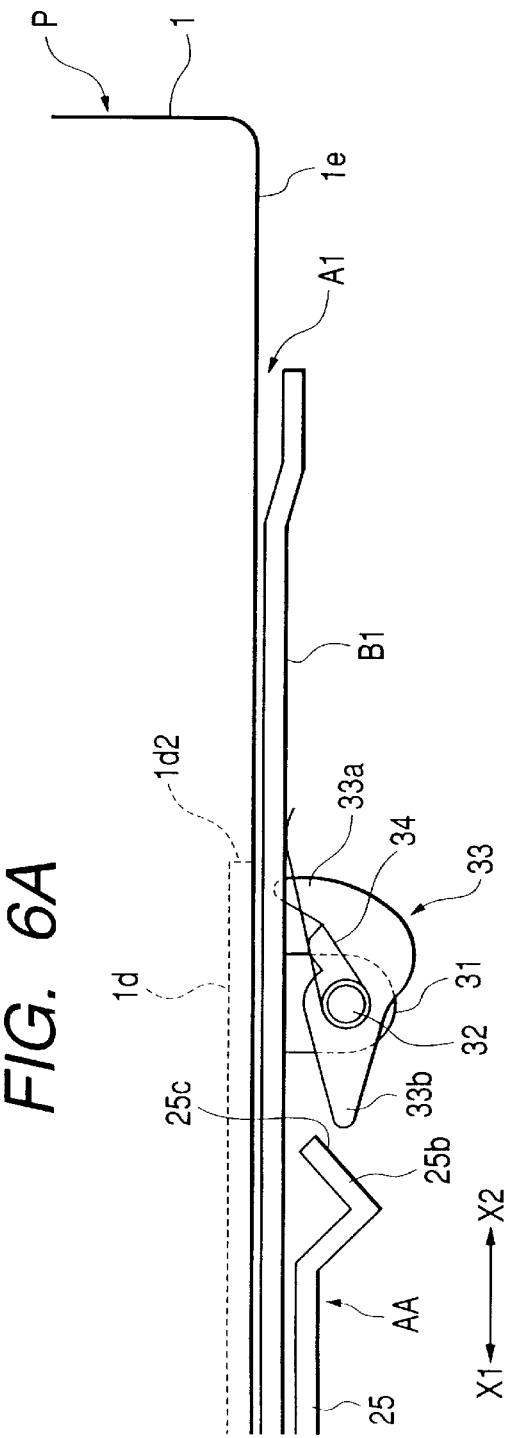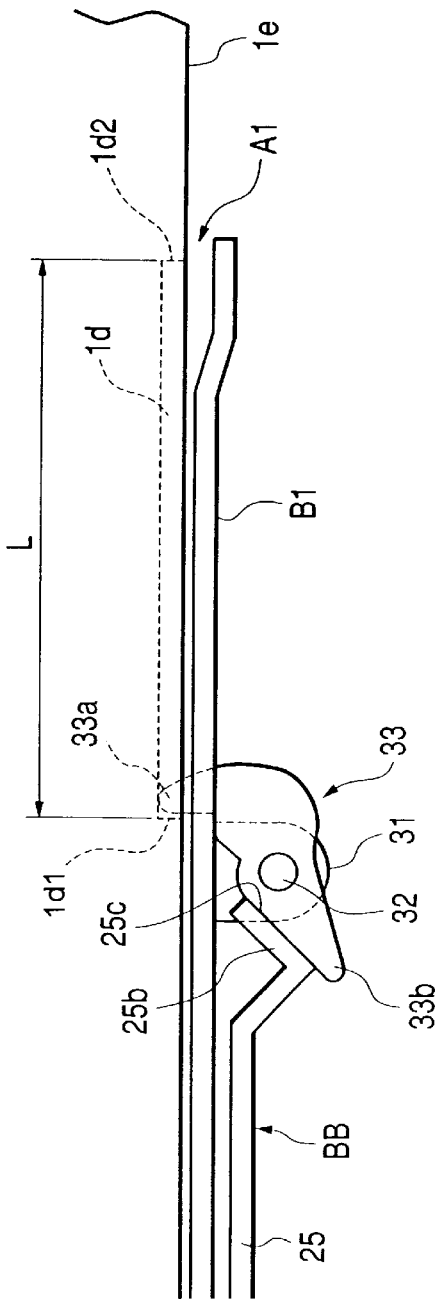

RECORDING MEDIUM LOADING DEVICE

BACKGROUND OF THE INVENTION

1. Field of the Invention

The present invention relates to a recording medium loading device for loading into the body of the device a package which contains a single or plural disks such as CD, CD-ROM, DVD, and/or PD, or a package which contains recording means other than disks.

2. Description of the Prior Art

In the body of a loading device into which is loaded, for example, a disk package containing a plurality of disks, there are provided an eject member which urges in an ejecting direction the disk package after insertion and a lock mechanism which locks the package in the device body to prevent ejection of the package.

According to a conventional structure of the lock mechanism, the disk package is formed with a guide groove extending in the direction of insertion into the device body and is also formed with a lock groove contiguous to the guide groove.

Also, in a package loading area of the device body is provided a lock projection which is urged in a direction of engagement with the lock groove.

When the disk package is inserted into the package loading area, the lock projection and side walls of the guide groove slide, and when the disk package has been loaded up to a final position, the lock projection is fitted in the lock groove and the disk package is locked in its loaded state into the package loading area. When the disk package is ejected, the lock member is driven by an unlocking member to disengage the lock projection from the guide groove. At this time, with an urging force for ejection given to the eject member, the disk package is pushed out toward an insertion port.

However, the conventional disk package loading device described above involves the following problems.

(1) When the lock projection and the lock groove are disengaged from each other, the disk package is discharged with the moving force of the eject member to which the urging force is imparted. At this time, the disk package undergoes the ejecting force of the eject member and projects vigorously from an ejection port. Therefore, even if an ejection load of a plate spring, for example, is imposed on the disk package, the package does not stop positively and may rush out from the insertion port. Particularly, a disk package containing a plurality of disks is heavy, so is apt to rush out vigorously from the insertion port by virtue of its inertia force.

(2) The provision of a stopper may be effective in preventing the disk package from rushing out vigorously. In this case, however, the disk package ejected by the eject member will strike against the stopper many times, thus requiring the stopper to be strong. For this reason, it is difficult for a small-sized device to be provided with a stopper having a satisfactory stopping function.

The present invention solves the aforesaid conventional problems and it is an object of the invention to provide a recording medium loading device whereby a package can surely be stopped at an intermediate position when it is ejected and the load acting on a stopper can be made small.

SUMMARY OF THE INVENTION

According to the present invention there is provided a recording medium loading device which permits a package containing a recording medium to be loaded removably into the body of the device, the package having a guide groove extending linearly in a direction of insertion into the device body, a lock groove contiguous to the guide groove and formed in a concave shape in a direction intersecting the direction of insertion, and a stopper groove extending along the direction of insertion and in parallel with the guide groove, and wherein in a package loading area of the device body are provided a lock member adapted to engage the lock groove to lock the package at a loaded position, an urging member for urging the lock member in a direction of engagement with the lock groove, a stopper projection adapted to project into the stopper groove, an unlocking member for disengaging the lock member from the lock groove and causing the stopper projection to project into the stopper groove, and an eject member for pushing out the package in a disengaged state of the lock member from the lock groove, and the package when moving in an ejecting direction is stopped at an intermediate position by engagement of the stopper projection with the stopper groove.

The package employable in the present invention is not limited to a package containing a plurality of disks, but may be a package containing a single disk or a package containing such a recording medium as memory or IC.

In the present invention, the package which is being ejected by the eject member stops at an intermediate position upon engagement of the stopper projection with the stopper groove. Thus, it is impossible that the package will rush out from an insertion port. The package can be held surely by hand.

In the package, the guide groove and the stopper groove independent of the guide groove are formed in parallel with each other, so the package is sure to be guided by the guide groove during insertion and ejection thereof. Even if the guide groove is a linear groove, the package can be stopped halfway by engagement of the stopper projection with the stopper groove, so, for example, even if the guide groove extend in two directions as in FIG. 3 to permit insertion of the package in the two directions, such a package is also applicable to the loading device of the present invention.

Preferably, the unlocking member is provided with a stopper driving portion for moving the stopper projection forcibly into the stopper groove so that after the package moving in the ejecting direction is stopped at an intermediate position, the unlocking member moves in a direction to remove the moving force for the stopper projection, allowing the stopper projection to be disengaged from the stopper groove.

Since the stopper projection is moved forcibly to the position of its engagement with the stopper groove by means of the unlocking member, the package being ejected can be stopped positively.

Preferably, except during ejection of the package, the stopper projection is urged in a direction of disengagement from the guide groove so that it can take refuge in a position spaced apart from the package.

In this construction, the stopper projection does not burden the movement of the package except when the stopper is applied, and therefore it is possible to diminish the resistance during insertion of the package.

Preferably, the stopper projection and an end portion of the stopper groove come into abutment with each other when the ejecting force of the eject member no longer operates on the package after the package has been moved in the ejecting direction by the eject member.

In this construction, moreover, the stopper projection is not given any large impulsive force when it comes into engagement with the stopper groove. Therefore, even if the size of the stopper projection is made small, there arises no fear of its breakage or the like.

BRIEF DESCRIPTION OF THE DRAWINGS

FIGS. 6A and 6B are enlarged side views as seen in the direction of arrow VI in FIGS. 4 and 5, respectively.

DETAILED DESCRIPTION OF A PREFERRED EMBODIMENT

Figure 1:
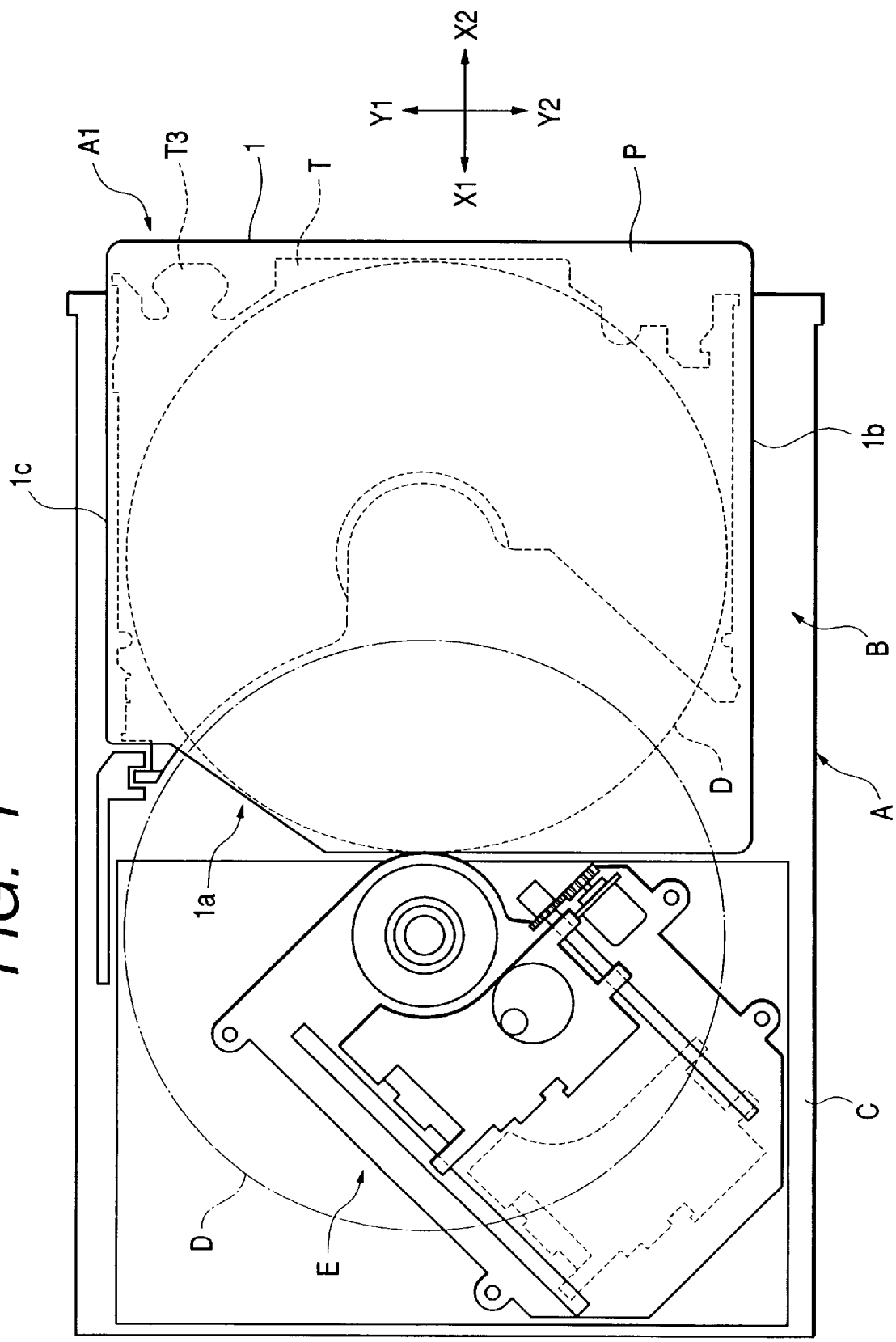
FIG. 1 is a sectional plan view of a disk unit embodying the present invention.
Figure 2:
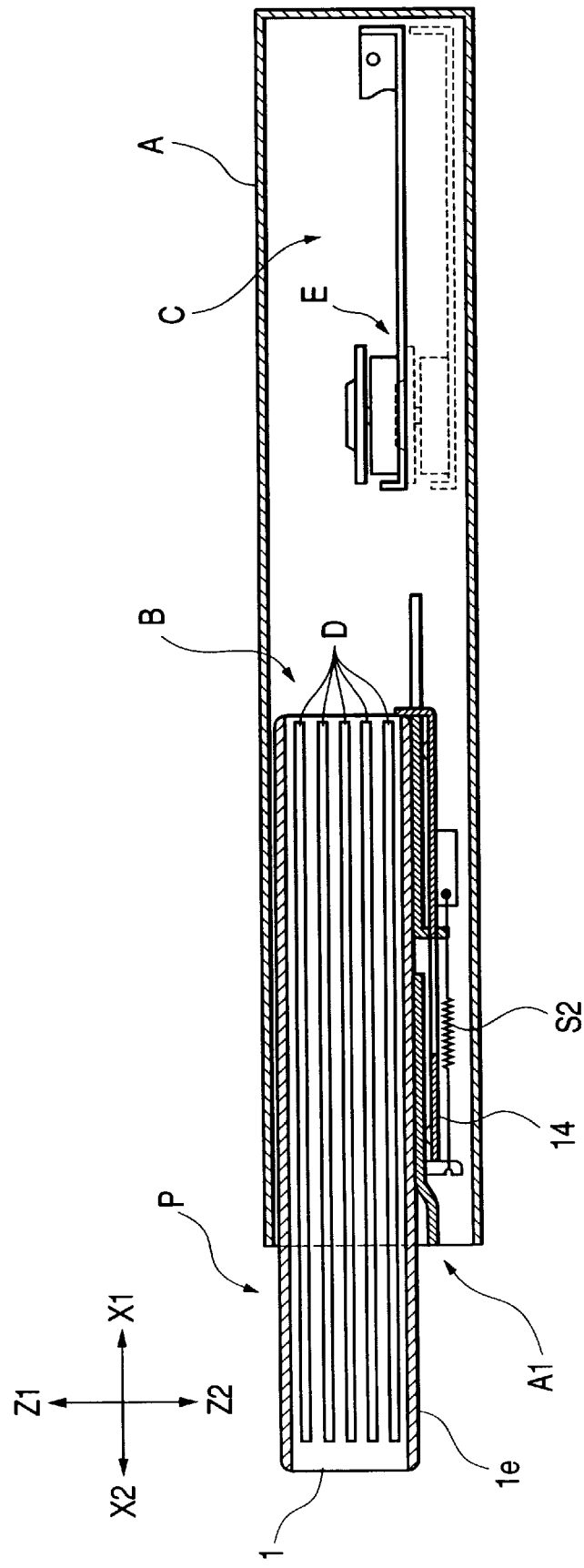
FIG. 2 is a longitudinal sectional view thereof.

FIG. 1 is a sectional plan view of a disk unit for loading therein of a disk package according to an embodiment of the present invention and FIG. 2 is a longitudinal sectional view thereof.

In the disk unit shown in FIGS. 1 and 2, a housing A is rectangular in plan and in the interior of the housing A are provided a package loading area B to which a disk package P is loaded and a disk driving area C. In the disk driving area C is disposed a disk drive means E for driving a disk D after drawn out from the disk package P.

The disk package P is inserted in X direction in FIGS. 1 and 2 into the housing A of the disk unit through an insertion port A1 formed in a longitudinally front position of the rectangular shape of the housing and is loaded into the package loading area B.

Figure 3:
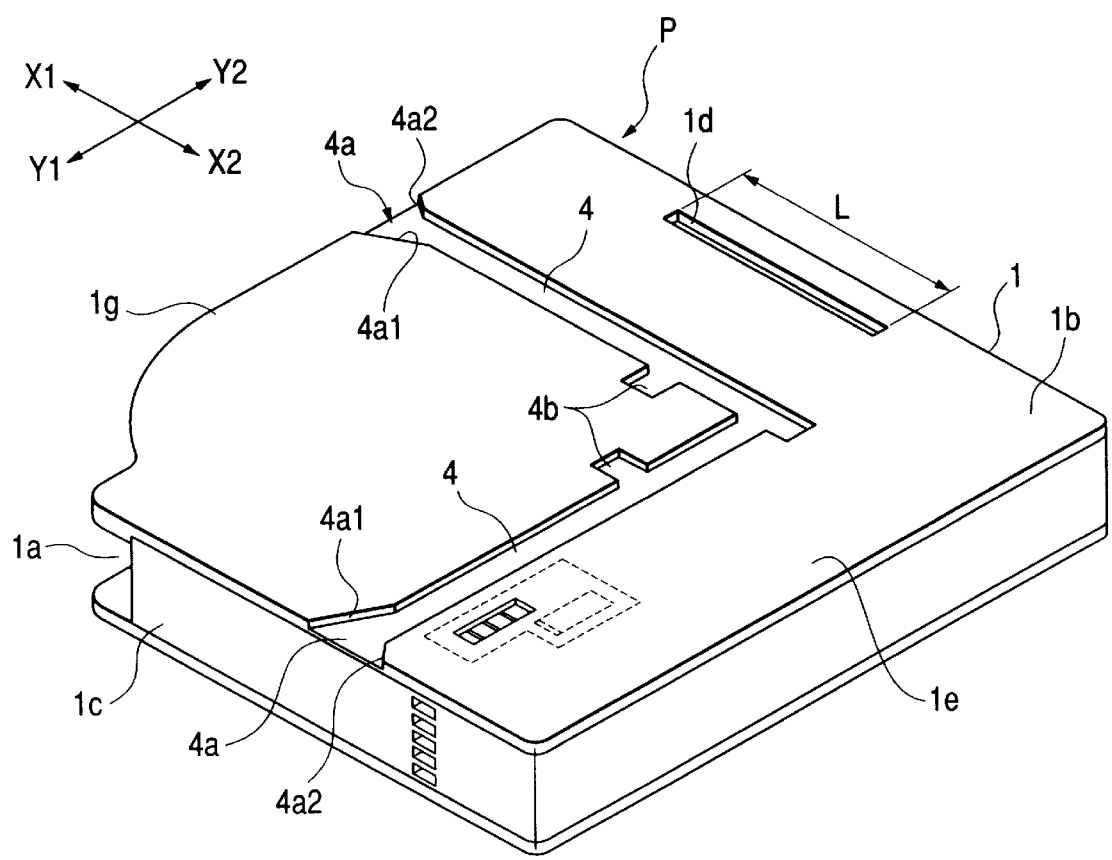
FIG. 3 is a perspective view with the bottom of a disk package facing upward.

FIG. 3 is a perspective view showing the appearance of the disk package, with the bottom of the package facing upward.

The disk package P is formed by a synthetic resin case 1, with an opening 1a being formed on X1 side in the figure. The opening 1a is for drawing out such tray T and disk D as indicated with dotted lines in FIG. 1. Through the opening 1a there are performed delivery and receipt of the disk D with respect to the disk drive means E.

A plurality of horizontal ribs (not shown) are projected on the inner surfaces of both left side plate 1b and right side plate 1c of the case 1 so that both right and left side edges of the tray T are slidable in X direction while being guided by adjacent such ribs. In the interior of the case 1 are formed plural stages of horizontal ribs and, for example, such five trays T as shown in FIG. 2 are accommodated within the case so that they can be drawn out.

Within the disk package P in this disk unit there can be received a disk having a diameter of 12 cm and a disk having a diameter of 8 cm. Also, both a ROM disk and a recordable RAM disk can be accommodated therein. Examples of ROM disks include CD and DVD-ROM, while examples of RAM disks include PD and DVD-RAM. Further, a single CD is an example of a disk having a diameter of 8 cm.

As shown in FIG. 3, two guide grooves 4, 4 are formed in X and Y directions in a bottom 1e of the disk package P. The guide grooves 4, 4 are formed linearly throughout the overall lengths in Y and Y directions. The guide groove 4 formed in X direction is used when the disk package P is inserted in X1 direction into the body of the device (the disk unit), as shown in FIG. 1, while the guide groove 4 formed in Y direction is for a disk unit of the type in which the disk package P is inserted in Y1 direction. At front ends (X1 and Y1 sides in the figure) of the guide grooves 4, 4 are respectively formed expanded portions 4a each defined by slant portions 4a1 and 4a2. Further, in the innermost portions on both X2 and Y2 sides are respectively formed lock grooves 4b which function as lock engaging portions for engagement therewith of a lock member 11 to be described later.

The disk package P containing various disks D is inserted and loaded into the package loading area B through the insertion port A1 of the housing A shown in FIGS. 1 and 2.

Figure 4:
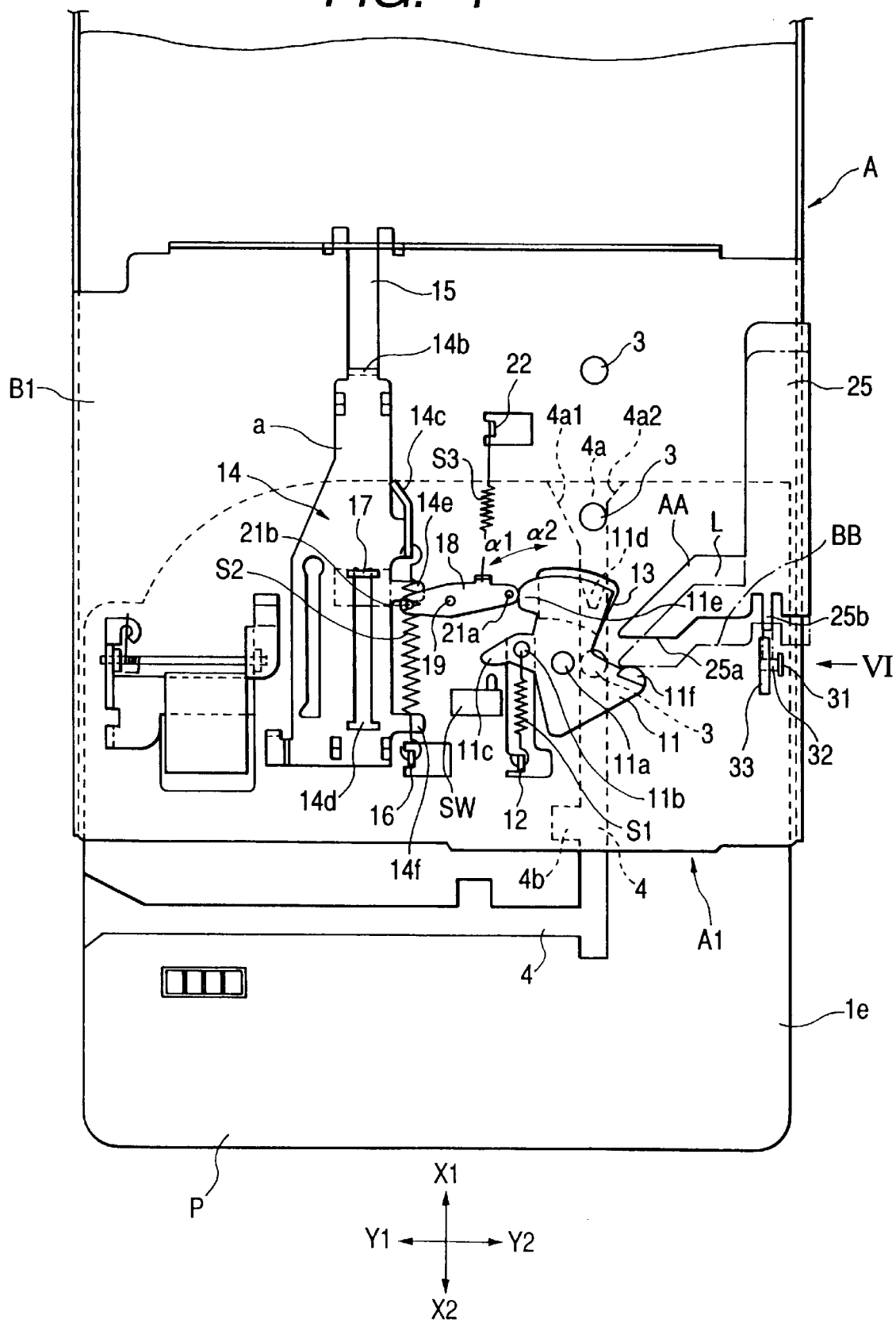
FIG. 4 is a bottom view showing a mechanical structure on the back side of a package loading area.
Figure 5:
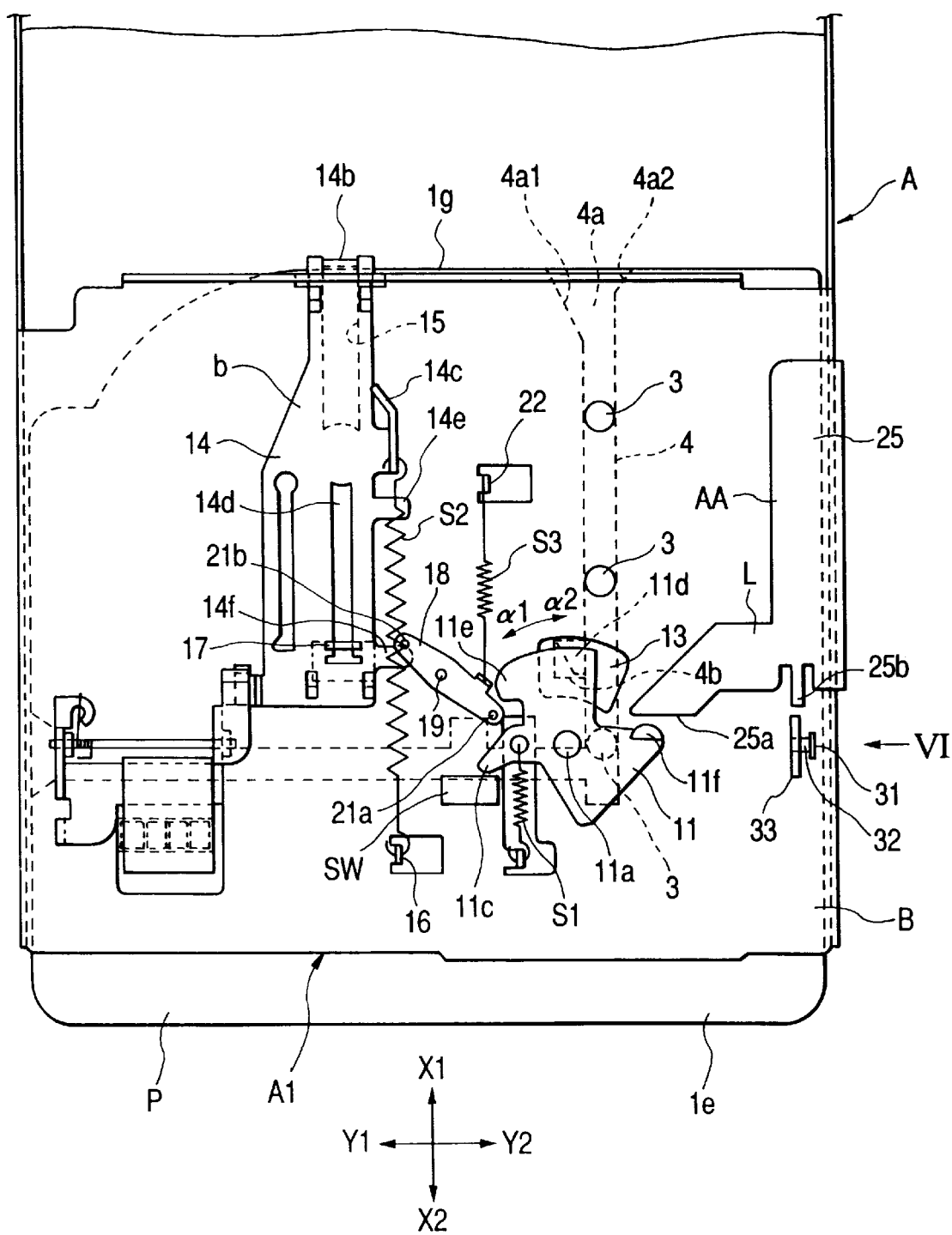
FIG. 5 is a bottom view showing the mechanical structure on the back side of the package loading area, with the package loaded completely.

FIGS. 4 and 5 are bottom views showing a mechanical structure provided on the bottom of the package loading area of the housing, with the bottom side (back side) of the disk unit facing upward.

In the package loading area B, a plurality of guide lugs 3 are formed on a bottom plate B1 of the housing of the device body. The guide lugs 3 are each constituted by a pin or a screw having a low head and implanted in the bottom plate B1. As shown in FIGS. 4 and 5, the guide lugs 3 are arranged in a row in an X direction. Since each guide groove 4 is formed linearly, the guide groove slides on the plural guide lugs 3, whereby the disk package P is guided and inserted in X1 direction.

The numeral 11 denotes a lock member formed by injection molding of a synthetic resin for example. The lock member 11 is rotatable about a support shaft 11a as fulcrum. The support shaft is fixed to the bottom plate B1. An urging member S1 such as, for example, a coiled spring is stretched between a hole 11b formed in the lock member 11 and a retaining portion 12 formed by bending from the housing A. With the urging member S1, the lock member 11 is urged in the direction of α1 in the figure. A switch pushing portion 11c of the lock member 11 extends in Y1 direction from the portion where the hole 11b is formed. A detection switch SW is mounted on the bottom plate B1 in such a manner that the switch pushing portion 11c is opposed to the switch SW.

The X1-side front end portion of the lock member 11 is integrally formed with a lock projection 11d extending toward the package loading area B. The projection 11d gets in a sectorial hole 13 formed in the bottom plate B1 of the housing A and projects into the package loading area B. On the Y1 side of the lock member is formed an abutting portion 11e, while on the Y2 side is formed an unlocking projection 11f integrally.

On the bottom plate B1 in the package loading area B of the housing A is mounted an eject plate 14 as an eject member. At an end portion in the X1 direction of the eject plate 14 is formed a T-shaped receptacle portion 14b which is bent inward of the housing A. The receptacle portion 14b is inserted into a guide groove 15 formed in the bottom plate B1. In the eject plate 14 is formed a guide groove 14d, into which is inserted a T-shaped projection 17 formed by bending from the bottom plate B1. The eject plate 14 is adapted to move linearly in X direction along both guide grooves 15 and 14d.

Between a retaining portion 14c formed on the eject plate 14 and a retaining piece 16 formed by bending on the bottom plate B1 in the package loading area B is stretched an urging member (eject urging member) S2 such as, for example, a coiled spring. The eject plate 14 is kept urged in X2 direction with the urging force of the urging member S2. FIG. 4 shows a state (a) in which the eject plate 14 has moved the longest distance in X2 direction. In this state, the receptacle portion 14b of the eject plate 14 strikes against the X2-side end portion of the guide groove 15, or the X1-side end portion of the guide groove 14d strikes against the T-shaped projection 17, whereby a further movement of the eject plate 14 in X2 direction from the position (a) is prevented.

On the Y2-side edge portion of the eject plate 14 are integrally formed a pair of lugs in a spaced relation to each other, of which the lug positioned on the X1 side is a restrictive pressing portion 14e and the lug positioned on the X2 side is a releasing pressing portion 14f. The eject plate 14 and the releasing pressing portion 14f function as a release member for releasing a restricting motion of a restriction link 18 against the lock member 11.

Between the lock member 11 and the eject plate 14 is disposed a restriction link 18 as a restriction member. The restriction link 18 is supported rotatably by a shaft 19 fixed to the bottom plate B1. Between the restriction link 18 and a retaining piece 22 formed on the bottom plate B1 is stretched an urging member (restrictive urging means) S3 such as, for example, a coiled spring. With the urging member S3, the restriction link 18 is urged in the counterclockwise direction. Pins 21a and 21b are fixed respectively to both ends of the restriction link 18. One pin 21a is opposed to the abutting portion 11e of the lock member 11 so that it can come into abutment with the abutting portion, while the other pin 21b is opposed to the position where it is pressed by the restrictive pressing portion 14e and the releasing pressing portion 14f of the eject plate 14.

At the Y2-side edge portion of the bottom plate B1 is mounted a lever 25 so as to be movable in X1–X2 directions, the lever 25 functioning as an unlocking member. With the power of a motor, the lever 25 is driven in X1–X2 directions, and with this moving force of the lever 25, the disk driving means shown in FIG. 2 is moved vertically in Z1–Z2 directions. By this vertical movement, a disk D present within the disk package P is selected. As the lever 25 moves in X2 direction, the disk driving means descends in Z2 direction, but when the lever 25 has reached the position indicated by AA in FIGS. 4 and 5, the disk driving means E moves to a position where the lowest stage of disk D in the disk package P can be selected. The lever 25 is further movable slightly in X2 direction from its position shown up to the position BB indicated with a chain line in FIG. 4. During this movement between the positions AA and BB, the disk driving means E remains stopped at the position permitting the selection of the lowest-stage disk.

The lever 25, which extends below the bottom plate B1 is integrally formed with an unlocking portion 25a extending in Y1 direction. The unlocking portion 25a is opposed to the unlocking projection 11f. On the Y2 side of the lock member 11 is provided such a stopper driving portion 25b as shown in FIGS. 6A and 6B.

FIG. 6 is a side view as seen in the direction of arrow V1 in FIGS. 4 and 5.

As shown in FIGS. 6A and 6B, a support piece 31 extending in the bottom direction is formed by bending from the bottom plate B1, and a stopper arm 33 is rotatably supported on a shaft 32 fixed to the support piece 31. A torsion spring 34 is mounted on the shaft 32 to urge the stopper arm 33 clockwise in FIG. 6. FIG. 6A shows a state in which the stopper arm 33 has turned most clockwise. The stopper arm 33 is restricted so as not to further turn in the clockwise direction from its position shown in FIG. 6A. A detailed structure for this restriction is here omitted.

At one end portion of the stopper arm 33 is integrally formed a stopper projection 33a, while at the opposite end portion thereof is formed a to-be-pressed portion 33b. The front end of the stopper driving portion 25b of the lever 25 is bent to provide a slant surface 25c. The to-be-pressed portion 33b of the stopper arm 33 is pressed by the slant surface 25c. Moreover, as shown in FIG. 3, in a bottom 1e of the case 1 of the disk package P is formed a stopper groove 1d extending in X direction and parallel with one guide groove 4. As shown in FIG. 6, the stopper projection 33a can get into the stopper groove 1d.

The following description is now provided about the operation of the disk unit constructed as above.

With the disk package P not inserted or being inserted, the lever 25 is in its position AA, as shown in FIG. 4. At this time, the unlocking portion 25a of the lever 25 is spaced apart from the unlocking projection 11f.

Moreover, as shown in FIG. 6A, the stopper driving portion 25b of the lever 25 is spaced away from the to-be-pressed portion 33b of the stopper arm 33. Consequently, the stopper arm 33 is pivotally moved clockwise with the biasing force of the torsion spring 34 and the stopper projection 33a moves down to the position of the bottom plate B1 without striking against the bottom 1e of the case 1 of the disk package P, thus being no obstacle to the insertion of the disk package.

The eject plate 14 moves in X2 direction with the urging force of the urging member S2 and assumes the position (a) shown in FIG. 4. Consequently, the pin 21b of the restriction link 18 is pushed in X2 direction by the restrictive pressing portion 14e of the eject plate 14 and pivotally moves counterclockwise. The Y2-side pin 21a of the restriction link 18 is in abutment with the abutting portion 11e of the lock member 11, whereby the lock member 11 is restricted to a turned state in $\alpha 2$ direction. As a result, the lock projection 11d integral with the lock member 11 and the plural guide lugs 3 are aligned with each other in X direction.

When the disk package P is inserted into the insertion port A1, the guide lugs 3 and the lock projection 11d positioned on a single straight line get into one guide groove 4 formed in the bottom 1e of the package case 1. While the disk package P is inserted in X1 direction, the lock projection 11d functions as a guide member together with the guide lugs 3 without exerting any pressure on the side walls of the guide groove 4, thus imposing no load on the disk package P during insertion of the package. Since the guide projection 11d stands still at its position shown in FIG. 4 and per se functions as a guide member, it is possible to use the guide projection as a guide member and hence possible to reduce the number of the guide lugs 3 or omit the guide lugs.

When the disk package P has entered the package loading area B, an edge portion 11g of the case 1 comes into abutment with the receptacle portion 14b of the eject plate 14. Further, upon insertion of the disk package P, the edge portion 11g pushes the receptacle portion 14b toward the inner part of the package loading area B, so that the eject plate 14 moves in X1 direction in the figure against the urging force of the urging member S2. When the disk package P has been inserted completely into the package loading area B, the eject plate 14 moves to the position (b), as shown in FIG. 5. At this time, the pin 21b of the restriction link 18 is pushed in X1 direction by the releasing pressing portion 14f of the eject plate 14 and moves in the clockwise direction. Consequently, the pin 21a located on the right-hand side of the restriction link 18 is disengaged from the abutting portion 11e to unlock the lock member 11, so that the lock member 11 pivotally moves in $\alpha 1$ direction with the urging force of the urging member S1. Then, the lock projection 11d of the lock member 11 is fitted in the lock groove 4b formed on X2 side of the guide groove 4 of the disk package P, whereby the disk package is locked in its loaded state in the package loading area B.

Description is now directed to the timing at which the restriction link 18 turns clockwise to unlock the lock member 11 and the timing at which the lock projection 11d gets in the lock groove 4b of the disk package P. After insertion of the disk package P in X1 direction and just before complete loading thereof in the package loading area B, the restriction link 18 is turned clockwise by the releasing pressing portion 14f to unlock the lock member 11, then the urging force of the urging member S1 in α1 direction acts on the lock member 11, so that the lock projection 11d is pressed elastically against the side walls of the guide groove 4 in the case 1. Just thereafter, upon complete loading of the disk package P, the lock projection 11d gets in the lock groove 4b by virtue of the urging member S1 to complete locking.

By setting the timings as above, when the disk package P is pushed in X1 direction by hand, the lock projection 11d surely gets into the lock groove 4b at the final stage of the pushing motion.

Alternatively, a modification may be made so that when the disk package P has been inserted completely into the package loading area B, the restriction link 18 is turned clockwise by the releasing pressing portion 14f to unlock the lock member 11 and at this time the lock projection 11d directly gets into the lock groove 4b.

Simultaneously with this locking motion, a push-button of the detection switch SW is pushed by the switch pushing portion 11c of the lock member 11, whereby an electric contact of the detection switch SW is turned ON. An ON signal is provided from the detection switch SW and it is thereby confirmed in an electric circuit mounted in the device body that the disk package P has been surely loaded and locked.

From the time when the disk package P is inserted from the insertion port A1 until when locking is completed as shown in FIG. 5, the lever 25 assumes the position AA (or may be positioned on X1 side with respect to the position AA). Therefore, the stopper arm 33 mounted on the electric plate B1 remains turned clockwise as in FIG. 6A and the stopper projection 33a is spaced apart from the bottom 1e of the package case 1. However, with the disk package P locked as in FIG. 5, an X2-side end portion 1d2 of the stopper groove 1d is positioned somewhat on X2 side rather than the position just above the stopper projection 33a, thus permitting the stopper projection 33a to get into the stopper groove 1d any time.

Now, a description will be given below of the operation for taking out the disk package P.

Taking out of the disk package P is started by operating an eject button mounted on an operation panel of the disk unit or on a remote controller or the like. Once the eject button is pushed, the lever 25 further moves in X2 direction from its position AA with the power of a motor and reaches the position BB, as shown in FIGS. 4 and 6B. Then, the unlocking projection 11f of the lock member 11 is pushed by the unlocking portion 25a of the lever 25, and the lock member 11 pivotally moves in α2 direction from its locked state shown in FIG. 5. Consequently, the lock projection 11d of the lock member 11 becomes disengaged from the lock groove 4b of the package case 1 and the disk package P is unlocked and becomes free. At this time, the edge portion 1g of the package case 1 is pushed in X2 direction by the receptacle portion 14b of the eject plate 14 which is trying to move in X2 direction under the action of the urging member S2, whereby the disk package P is ejected in X2 direction.

Simultaneously with the movement of the lever 25 to the position BB and consequent unlocking of the lock member 11, the stopper driving portion 25b of the lever 25 pushes the to-be-pressed portion 33b of the stopper arm 33, as shown in FIG. 6B, so that the stopper arm 33 turns in the counterclockwise direction and the stopper projection 33a gets into the stopper groove 1d formed in the bottom 1e of the package case 1. Therefore, in the disk package P which is ejected in X2 direction by the eject plate 14, as shown in FIG. 6B, an X1-side end portion 1d1 of the stopper groove 1d strikes against the stopper projection 33a and does not project any further in X2 direction. As shown in FIG. 6B, when the end portion 1d1 of the stopper groove 1d strikes against the stopper projection 33a, the eject plate 14 arrives at the position (a) shown in FIG. 4 and the guide groove 15 and the receptacle portion 14b strike against each other, or the guide groove 14d and the T-shaped projection 17 come into abutment with each other, so that the eject plate 14 stops. At this time, the urging force in X2 direction of the urging member S2 does not act on the eject plate 14.

Therefore, as shown in FIG. 6B, when the end portion 1d1 of the stopper groove 1d strikes against the stopper projection 33a, the ejection urging force in X2 direction of the urging member S2 does not operate on the disk package P. Since the end portion 1d1 of the stopper groove 1d does not push the stopper projection 33a impulsively in X2 direction, there is no fear of the stopper arm 33 being deformed or damaged with the ejection force of the disk package P even if the stopper arm is formed in a very small size by molding a resin for example.

When the eject plate 14 moves in X2 direction and arrives at the position (a) shown in FIG. 4, the releasing pressing portion 14f of the eject plate 14 moves away from the pin 21b, and the restriction link 18 returns counterclockwise to its original position with the biasing force of the urging member S3. Further, the pin 21b is pushed in X2 direction by the restrictive pressing portion 14e of the eject plate 14, so that the restriction link 18 is turned forcibly in the counterclockwise direction. Consequently, the pin 21a of the restriction link 18 comes into abutment with the abutting portion 11e of the lock member 11, the lock member 11 is turned in α2 direction, and the lock projection 11d stops at the position where it is aligned with the guide lugs 3.

Just after completion of the ejecting motion, the disk package P stops while projecting a predetermined distance from the insertion port A1 of the housing A. In this state it is impossible to draw out the disk package P because the stopper projection 33a is within the stopper groove 1d, as shown in FIG. 6B. Therefore, just after projection of the disk package P into its state shown in FIGS. 4 and 6B, the lever 25 is moved in X1 direction with the power of a motor and returns to the position AA, while the stopper driving portion 25b leaves the stopper arm 33. With the biasing force of the torsion spring 34, the stopper arm 33 then turns clockwise as in FIG. 6A and the stopper projection 33a is disengaged from the stopper groove 1d, thus making it possible to draw out the disk package P in X2 direction.

The timing for moving the lever 25 in X1 direction from its state shown in FIG. 6B is taken as follows. For example, it is detected with a switch that the disk package P has projected up to its position shown in FIG. 4, and when this detected output signal is obtained, the motor is started to move the lever 25 in X1 direction. Alternatively, the lever 25 is moved from the position AA to the position BB to let the lock member 11 operate, then after unlocking the disk package P, a predetermined time is set with a timer, and after the lapse of the predetermined time, the lever 25 is returned in X1 direction.

As shown in FIG. 6A, while the disk package P is loaded into the disk loading device, the end portion 1*d*2 of the stopper groove 1*d* is positioned on X2 side rather than the position just above the stopper projection 33*a* so that the stopper projection can get into the stopper groove 1*d* immediately after unlocking. It is necessary that when the disk package P is ejected by the eject plate 14 and stops at the position (a), the end portion 1*d*1 of the stopper groove 1*d* be in abutment with or in close proximity to the stopper projection 33*a*. Therefore, it is necessary that the length L of the stopper groove 1*d* be almost equal to or larger than the moving distance of the eject plate 14, i.e., the moving distance at which the disk package P is pushed out by the eject plate 14 from its locked state.

According to this embodiment, as shown in FIG. 5, only when the disk package P is locked in the package loading area B, the lock member 11 turns in α1 direction and the detection switch SW turns ON. But in other cases, that is, when the disk package P is not inserted or while it is being inserted, the lock member 11 is restricted by the restriction link 18 and turns in α2 direction, with the detection switch SW remaining OFF.

Thus, the detection switch SW turns ON only when the disk package P has been loaded and hence with a single detection switch SW it is possible to surely detect whether the disk package P has been loaded or not. For example, by monitoring the state of the detection switch SW when the power is turned ON, it is possible to surely detect whether the disk package is in its loaded state or not. Further, the detection switch SW does not turn ON unless the disk package P is locked firmly, so there is no fear of misjudgment that the disk package has been loaded despite the package being in an incompletely inserted state.

According to the recording medium loading device of the present invention, as set forth above, the package when ejected is sure to stop at the position where it can be held by hand.

The stopper projection never burden the package loading work.

Further, it is possible to weaken the impact force exerted on the stopper projection and thereby prevent damage of the stopper projection.

What is claimed is:

1. A recording medium loading device which permits a package containing a recording medium to be loaded removably into the body of the device, said package having a guide groove extending linearly in a direction of insertion into the device body, a lock groove contiguous to said guide groove and formed in a concave shape in a direction intersecting said direction of insertion, and a stopper groove extending along said direction of insertion and in parallel with said guide groove, and wherein in a package loading area of the device body are provided a lock member to engage with said lock groove to lock the package at a loaded position, a first urging member to urge said lock member in a direction of engagement with said lock groove, a stopper projection to project into and engage/disengage with said stopper groove, a second urging member to urge said stopper projection outside said stopper groove at a time of insertion of said package, an unlocking member to disengage said locking member from said lock groove in opposition to said first urging member and to cause said stopper projection to project into said stopper groove in opposition to an urging force of said second urging member, and an eject member to push out the package in a disengaged state of said locking member in an ejecting direction from said lock groove, wherein said unlocking member is provided with a stopper driving portion to forcibly move said stopper projection into said stopper groove in opposition to said urging force of said second urging member when said package is ejected, when said package is pushed out in the ejecting direction by said eject member, said package is moved such that said stopper projection is fitted in said stopper groove at the time when said stopper projection is in abutment with an end portion of said stopper groove, said stopper driving portion removes a moving force of said stopper projection and said stopper projection is disengaged from said stopper groove.

2. A recording medium loading device according to claim 1, wherein, except during ejection of the package, said stopper projection is urged in a direction of disengagement from said guide groove so that it can take refuge in a position spaced apart from the package.

3. A recording medium loading device according to claim 2, wherein said stopper projection and said end portion of said stopper groove come into abutment with each other when the ejecting force of said eject member no longer operates on the package after the package has been moved in the ejecting direction by the eject member.

4. A recording medium loading device according claim 1, wherein said stopper projection and said end portion of said stopper groove come into abutment with each other when the ejecting force of said eject member no longer operates on the package after the package has been moved in the ejecting direction by the eject member.

* * * * *